United States Patent [19]
van der Pol

[11] Patent Number: 5,121,640
[45] Date of Patent: Jun. 16, 1992

[54] ELECTROMAGNETIC FLOW METER

[75] Inventor: Ronald van der Pol, Venlo, Netherlands

[73] Assignee: Krohne AG, Basel, Switzerland

[21] Appl. No.: 543,824

[22] PCT Filed: Nov. 19, 1988

[86] PCT No.: PCT/EP88/01060

§ 371 Date: Jul. 18, 1990

§ 102(e) Date: Jul. 18, 1990

[87] PCT Pub. No.: WO90/05894

PCT Pub. Date: May 31, 1990

[51] Int. Cl.$^5$ ................................................ G01F 1/58
[52] U.S. Cl. .................................................. 73/861.12
[58] Field of Search ....................................... 73/861.12

[56] References Cited

U.S. PATENT DOCUMENTS 4,181,018 1/1980 Schmoock .................... 73/861.12
4,774,844 10/1988 Davis ............................ 73/861.12

FOREIGN PATENT DOCUMENTS 0047342 3/1982 European Pat. Off. ......... 73/861.12
1573066 10/1970 Fed. Rep. of Germany ... 73/861.12

Primary Examiner—Reinhard J. Eisenzopf
Assistant Examiner—E. Shopbell
Attorney, Agent, or Firm—Townsend and Townsend

[57] ABSTRACT

An electromagnetic flow meter consists of a metering tube made of an electrically non-conductive material and having a thick outer wall. The tube has at least two measuring electrodes and at least two magnetic poles, each of which is disposed in a blind bore of the tube. The poles are linked to one another by a yoke fitted with a magnetic coil. To achieve greater measuring precision both the yoke and the magnetic coils are mounted in a recess inside the outer surface of the metering tube. The recesses are in the form of through holes and grooves. When fully assembled all magnet components are disposed inside the outer surface of the metering tube.

9 Claims, 3 Drawing Sheets

ELECTROMAGNETIC FLOW METER

BACKGROUND OF THE INVENTION

The invention relates to an electromagnetic flow meter, comprising a metering tube having a thick outer wall made of an electrically non-conducting material. It has at least two measuring electrodes and at least two magnetic poles, each of which is disposed in a blind bore of the metering tube. They are linked to one another by a yoke and have at least one magnetic coil.

In a known magnetic-inductive flow meter, as described for example in German patent publication DE-OS 15 73 066, the yoke linking the magnetic poles is disposed outside the periphery or outer surface of the metering tube. Such an arrangement requires an inordinate amount of space for the yoke and, for small diameters, results in significant losses of magnetic flux and a reduced sensitivity. These drawbacks are also encountered with arrangements in which the cores of the magnetic coils are mounted on a ferromagnetic housing for the magnetic reflux (cf. EP 0047342 B1; U.S. Pat. No. 4,089,113; German Patent DE 35 11 033).

SUMMARY OF THE INVENTION

To overcome these drawbacks the present invention places the yoke and the magnetic coils into a recess inside the outer wall of the metering tube.

Positioning the yoke and the excitation coil inside the tube renders the magnetic circuit significantly more stable and increases the measurement accuracy. Moreover, the magnet components require no additional space. Thus, such instruments are significantly more compact.

Placing the yoke and the magnetic coil inside the metering tube makes it easier to conform the instrument to special design requirements and facilitates its manufacture. In a simple embodiment of the invention, a midportion of the yoke which supports the magnetic coil is disposed inside a through hole which extends parallel to the blind bores for the magnetic poles. An intermediate section of the yoke, which connects the midportion to the magnetic poles, is disposed in grooves in the exterior surface of the metering tube. In a more developed embodiment of the invention, multiple through holes in the metering tube extend parallel to the blind bores for the magnet poles. In this manner, one or more yokes can optionally be inserted into or extended through the holes as desired.

In another simple embodiment of the invention, the midportion of the yoke mounting the magnetic coils is placed inside a semi-circular groove which extends between the blind bores. This permits insertion of the yoke and the magnetic coils into the groove from the outside.

The magnetic coils may be constructed as required by the surroundings and operational considerations. For example, the magnetic poles may be connected with two arcuate yokes which are parallel to one another. To enhance the magnetic flux, the yoke can be extended through multiple, successive bores and provided with multiple coil windings.

To facilitate the installation of the magnet components in the bore or grooves, the yoke is preferably constructed of two or more sections that can be inserted into and assembled in the holes and/or grooves.

BRIEF DESCRIPTION OF THE DRAWINGS

Multiple embodiments of the present invention are shown in the below, in which.

DESCRIPTION OF THE PREFERRED EMBODIMENTS

Figure 1:
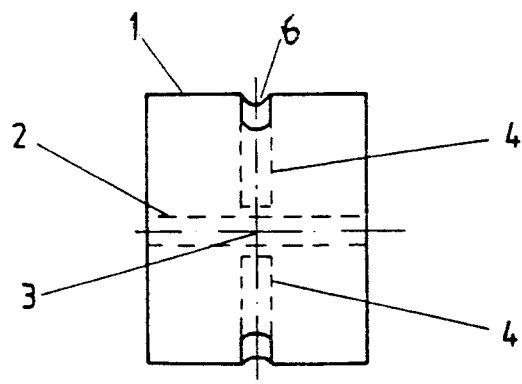
FIG. 1 is a side elevational view of a metering tube.
Figure 2:
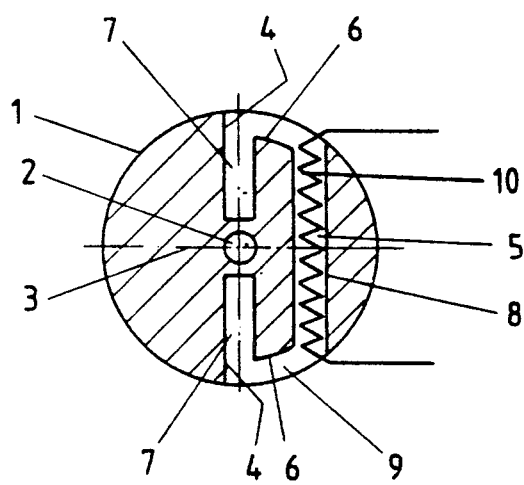
FIG. 2 is a cross-section taken at a midportion of the tube of FIG. 1 and shows the magnetic poles and a yoke.
Figure 3:
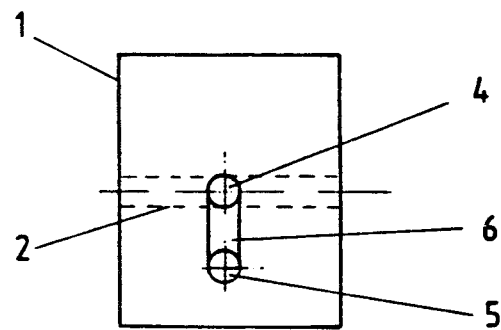
FIG. 3 is a plan view of the tube of FIG. 1.

A metering tube 1 for a magnetically inductive flow meter as shown in FIG. 1-3 is constructed of an electrically non-conductive material such as plastic, ceramic or the like. It has a cylindrical shape and an axial flow-through bore 2. The metering tube has an especially thick outer wall, that is, the diameter of the outer wall is several times greater than the diameter of flow bore 2. Two measuring electrodes 3 are mounted inside metering tube 1 perpendicular to flow bore 2 at diametrically opposite locations in an air and water impervious manner. The electrode heads extend to flow bore 2 to bring them into contact with the fluid being metered.

Metering tube 1 further includes two, diametrically opposite blind bores 4 which are displaced 90° relative to measuring electrodes 3 and receive two magnetic poles 7 constructed of a ferromagnetic material. A through hole 5 within metering tube 1 extends parallel to blind bores 4 on one side of the flow bore 2 and receives a yoke 8 that connects magnetic poles 7 to each other. Each of the outer ends of through hole 5 is linked to the adjacent blind bores by a groove 6 which receives an intermediate section 9 of the yoke that is connected to the adjacent magnetic pole. Both yoke 8 and the intermediate section 9 are also made of a ferromagnetic material. The magnetic components of the instrument, formed by two magnetic poles 7, intermediate section 9 and yoke 8, which includes a magnetic coil 10, are of a modular construction to facilitate their installation in blind bore 4 and in the recess defined by through bore 5 and grooves 6. The components must be in mutual contact to assure magnetic reflux. When installed, all components of the magnets are located inside the exterior surface of metering tube 1.

Figure 4:
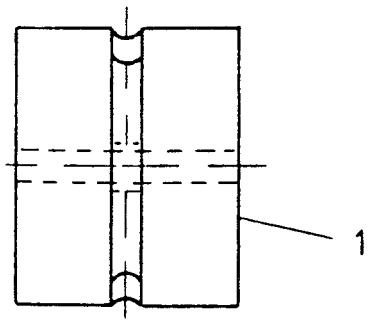
FIG. 4 is a second embodiment of a metering tube.
Figure 5:
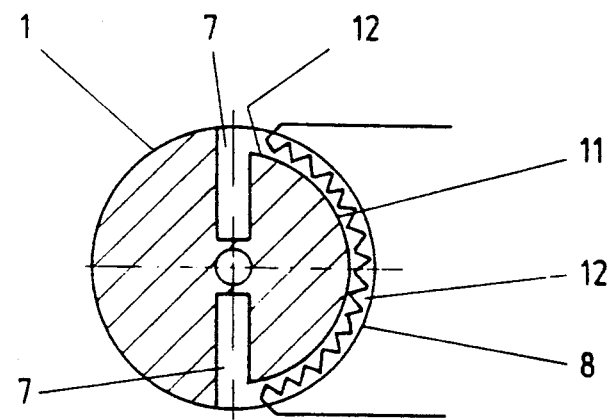
FIG. 5 is a cross-section taken at a midportion of the tube of FIG. 4 and shows the magnetic poles and a yoke.

In an alternative embodiment, shown in FIGS. 4 and 5, a groove 11 for receiving the midportion 12 of yoke 8 extends along the periphery of the outer surface of the metering tube and links the blind bores 4. The magnet components of this embodiment are also of a modular construction to permit their installation and assembly within the metering tube.

Figure 6:
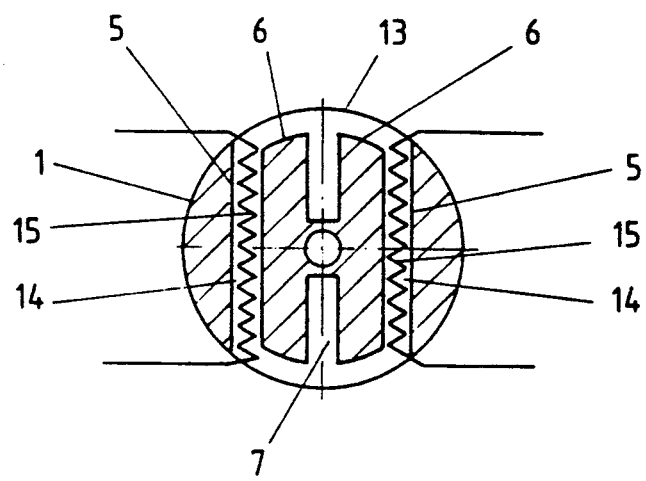
FIG. 6 is a cross-section of a third embodiment of the present invention and shows the magnetic poles and a yoke.

FIG. 6 shows an embodiment of a metering tube 1 which has two diametrically opposite through holes 5 that are connected by grooves 6. The magnetic poles 7 are connected by two parallel arcuate yokes 14. Each of these arcuate yokes has a magnetic coil 15 through which parallel currents flow in like directions. This embodiment exhibits an increased magnetic flux.

Figure 7:
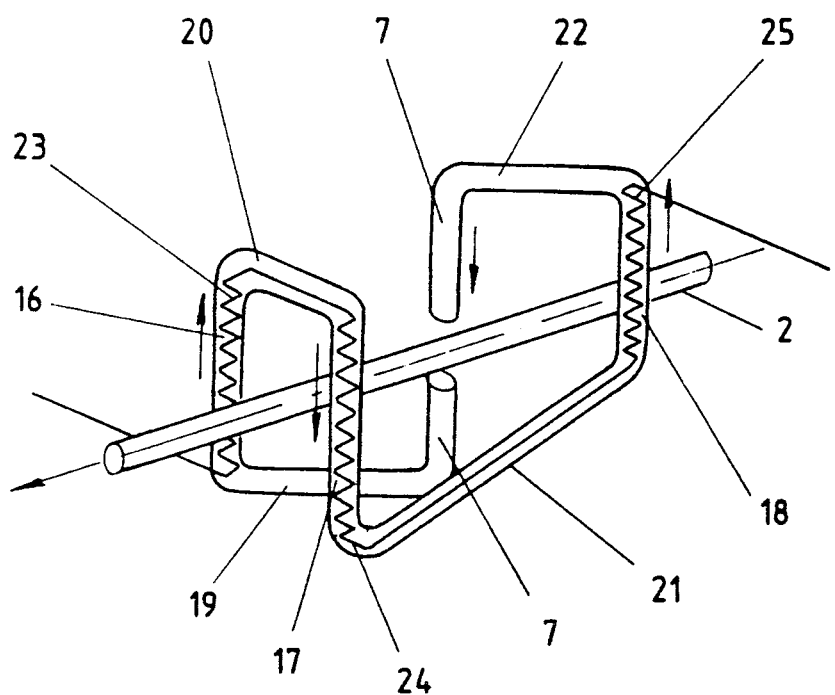
FIG. 7 is a perspective view of a yoke provided with three magnetic coils.

To further intensify the magnetic flux it is possible, as shown for example in FIG. 7, to pass the yoke that connects the magnetic poles sequentially through multiple bores and to provide it with multiple magnetic coils 23 to 25. FIG. 7 shows only the magnet components and a schematic of flow bore 2. This embodiment has 3 elbows 16 to 18 and associated through holes (not shown) suitably arranged within the metering tube. Further, the metering tube includes grooves (also not shown) in the exterior surface of the metering tube which link the blind bores 4 which house the magnetic poles 7 with the through holes and receive intermediate sections 19 to 22.

What is claimed is:

1. An electromagnetic flow meter comprising a metering tube having an axially extending flow-through bore and a relatively thick wall surrounding the bore terminating at and defining an exterior surface of the tube, the tube including first and second blind openings extending from the exterior surface into the tube and terminating proximate the flow-through bore, a passage way generally parallel to and spaced from the blind openings, extending through the tube and terminating at the exterior surface, and open grooves formed in the exterior surface of the tube and in communication with ends of the blind openings and ends of the passage way, the blind openings, the passage way and the open grooves being prefabricated from an electrically nonconductive material, first and second magnetic pole pieces disposed in the blink openings, a yoke interconnecting the pole pieces and disposed in the passage way and the open grooves, a magnetic coil operatively connected with the yoke an disposed in at least one of the passage way and the grooves, and at least two measuring electrodes operatively positioned in the metering tube relative to the flow-through bore.

2. A flowmeter according to claim 1, wherein the yoke includes a midsection which carries the magnetic coil (10) and the passage way comprises a through hole (5) which extends parallel to the blind openings (4) for the magnetic pole pieces (7), the yoke including intermediate sections (9) which connect the midsection with the magnetic pole pieces (7), the intermediate sections being disposed in the open grooves (6).

3. A flowmeter according to claim 1, wherein the metering tube (1) has a plurality of passage ways which are parallel to the blind openings (4) that receive the magnetic pole pieces (7).

4. A flowmeter according to claim 1, wherein the yoke includes a midsection (12) which carries the magnetic coil (10) and wherein the passage way is a semicircularly-shaped open trough in the exterior surface of the tube which includes the open grooves and connects with the blind openings (4).

5. A flowmeter according to claim 1 including parallel arcuate yokes (14) which connect the magnetic pole pieces (7).

6. A flowmeter according to claim 1, wherein the tube includes a plurality of successive passage ways and open grooves, the yoke is shaped to extend along the successive passage ways and grooves, and including a plurality of electromagnetic coils operatively coupled with the yoke.

7. A flowmeter according to claim 1, wherein the yoke is constructed of at least two segments which can be placed into the blind openings, the passage way and the grooves (6,11) and which can be interconnected.

8. A flow meter according to claim 1 wherein the passage way defines an open trough in the exterior surface of the tube.

9. A flow meter according to claim 1 wherein the passage way defines an elongated, open ended hole.

* * * * *